United States Patent [19]

Powers

[11] 4,378,985

[45] Apr. 5, 1983

[54] METHOD AND APPARATUS FOR FORMING AN OPTICAL WAVEGUIDE FIBER

[75] Inventor: Dale R. Powers, Painted Post, N.Y.

[73] Assignee: Corning Glass Works, Corning, N.Y.

[21] Appl. No.: 270,235

[22] Filed: Jun. 4, 1981

[51] Int. Cl.³ .................. C03B 19/06; C03B 37/025; C03B 37/07

[52] U.S. Cl. ...................... 65/3.12; 65/3.2; 65/18.2; 65/144; 65/160

[58] Field of Search ............ 65/3.12, 3.2, 18.2, 65/144, 160; 427/163; 118/730

[56] References Cited

U.S. PATENT DOCUMENTS

| | | | |
|---|---|---|---|
| 3,923,484 | 12/1975 | Randall | 65/3.12 X |
| 3,957,474 | 5/1976 | Kobayashi et al. | 65/3.12 |
| 4,062,665 | 12/1977 | Izawa et al. | 65/18.2 X |
| 4,230,472 | 10/1980 | Schultz | 65/18.2 X |
| 4,310,339 | 1/1982 | Blankenship | 65/18.2 X |

FOREIGN PATENT DOCUMENTS

| | | | |
|---|---|---|---|
| 53-13932 | 2/1978 | Japan | 65/18.2 |
| 54-7355 | 1/1979 | Japan | 65/3.12 |
| 2023127 | 12/1979 | United Kingdom . | |

*Primary Examiner*—Richard V. Fisher
*Attorney, Agent, or Firm*—William J. Simmons, Jr.

[57] ABSTRACT

A porous glass optical waveguide preform is formed by depositing a coating of glass particulate material on the lateral surface of a core which may be a porous glass body produced by the axial deposition of glass particulate material. The core rotates and moves longitudinally in one direction with respect to a flame hydrolysis burner. In addition, the burner oscillates longitudinally with respect to a portion of the length of the core.

17 Claims, 7 Drawing Figures

METHOD AND APPARATUS FOR FORMING AN OPTICAL WAVEGUIDE FIBER

BACKGROUND OF THE INVENTION

The present invention relates to the manufacture of optical waveguide fibers.

Optical waveguide fibers have been greatly improved during the last decade. Fibers exhibiting very low losses are generally formed by chemical vapor deposition (CVD) techniques which result in the formation of extremely pure materials. In accordance with these techniques, optical waveguide preforms can be formed by depositing glass layers on the outside surface of a temporary mandrel, or on the inside surface of a tube which later forms at least a portion of the cladding material, or by some combination of these techniques. These two embodiments of the CVD technique will be briefly described below.

In accordance with one embodiment of the CVD technique, often referred to as the inside vapor phase oxidation process, the reactant vapor, together with an oxidizing medium, flow through a hollow, cylindrical substrate. The substrate and the contained vapor mixture are heated by a source that moves relative to the substrate in a longitudinal direction, whereby a moving hot zone is established within the substrate tube. A suspension of particulate material which is produced within the hot zone travels downstream where at least a portion thereof comes to rest on the inner surface of the substrate where it is fused to form a continuous glassy deposit. After suitable layers have been deposited to serve as the cladding and/or core material of the resultant optical waveguide fiber, the temperature of the glass tube is generally increased to cause the tube to collapse. The resultant draw blank is then drawn in accordance with well known techniques to form an optical waveguide fiber having the desired diameter.

In another embodiment of the CVD process the vapor of reactant compounds is introduced into a flame where it is oxidized to form a glass particulate material or soot which is directed toward a mandrel. This so-called flame hydrolysis or outside vapor phase oxidation method of forming coatings of glass soot is described in greater detail in U.S. Pat. Nos. 3,737,292; 3,823,995; 3,884,550; 3,957,474 and 4,135,901. To form a step-index optical waveguide fiber, a second coating having a lower refractive index than the first is applied over the outside peripheral surface of the first coating. To form a gradient index fiber, a plurality of layers of glass soot are applied to the starting member, each layer having a progressively lower index of refraction as taught in U.S. Pat. No. 3,823,995. Gradient index fibers may also be provided with a coating of cladding material. After the plurality of coatings are formed on the mandrel, the mandrel is generally removed and the resultant tubular preform is gradually inserted into a consolidation furnace, the temperature of which is sufficient high to fuse the particles of glass soot and thereby consolidate the soot preform into a dense glass body in which no particle boundaries exist. In one embodiment of the outside vapor phase oxidation process, which is described in U.S. Pat. No. 3,957,474, the starting rod forms the core of the resultant fiber. The deposited cladding soot is consolidated on the surface of the core rod. The resultant consolidated blank is drawn into an optical waveguide fiber.

Although CVD techniques of forming optical waveguide preforms result in the formation of optical waveguide fibers having extremely low attenuation, they are relatively expensive. The size of preform which can be formed by the inside vapor phase oxidation process is relatively limited. The length of the hollow cylindrical substrate tube is limited to that length which can be supported between two separated chucks while being heated to reaction temperature. The substrate tube diameter is also limited in that process.

Fiber manufacturing cost can be lowered by increasing preform size or by continuously drawing fiber from a preform while the preform is being formed. Both of these cost reducing techniques decrease the number of preform handling and processing steps per unit of fiber length.

The outside vapor phase oxidation technique readily lends itself to cost reducing modifications. Initially, preforms were made larger by increasing the diameter. This was initially accomplished by traversing the burner longitudinally along the soot preform and adding thereto additional layers of increasing radius. Thereafter, axial techniques were developed whereby one or more burners or other soot depositing nozzles were directed axially toward a starting member. As the thickness of the deposited soot layer increases, the starting member moves away from the burners. Axial vapor phase oxidation techniques are taught in U.S. Pat. Nos. 3,966,446, 4,017,288, 4,135,901, 4,224,046 and 4,231,774.

A hybrid technique whereby a core is formed by axial vapor phase oxidation and a cladding layer is simultaneously deposited on the core by radially inwardly directed glass soot streams is taught in U.S. Pat. Nos. 3,957,474 and 4,062,665. As the core is formed, it is withdrawn from the burners or nozzles which formed it. The cladding is deposited by stationary burners or nozzles.

Substantially continuous methods of forming optical waveguide fibers by vapor phase oxidation techniques are taught in U.S. Pat. No. 4,230,472 issued to P. C. Schultz, U.K. Patent Application GB 2,023,127A and U.S. Pat. No. 4,310,339 issued to M. G. Blankenship.

In accordance with the Schultz patent a substantially continuous core member is longitudinally translated while there is simultaneously applied thereto an adherent coating of particulate material to form a continuous and substantially homogeneous adherent coating of substantially uniform thickness. The composite so formed is simultaneously or subsequently heated to sinter or consolidate the applied adherent coating thereby forming a solid blank which may be heated to the drawing temperature of the material thereof and drawn to reduce the cross-sectional area thereof, thereby forming a substantially continuous optical waveguide. The core member comprises the core while the consolidated coating comprises the cladding of the resultant optical waveguide. The adherent coating may be sintered or consolidated to form a solid blank and thereafter drawn in a separate operation or subsequently drawn as part of a continuing operation. As an alternative, the optical waveguide may be drawn immediately following the sintering or consolidation step employing a single heating of the structure.

In accordance with GB 2,023,127A a bare fiber core is drawn from a heated glass rod. Cladding is formed on the core fiber by vapor deposition of fine granules of glass which are thereafter heated to form a consolidated glass cladding.

The Blankenship patent teaches a substantially continuous method of forming an article suitable for an optical waveguide preform. The preform is formed by providing a starting member or bait and applying the particulate material to the exterior surface of the starting member to form a coating thereon. The coating is longitudinally translated while simultaneously additional particulate material is applied to the coating to form a preform body with the preform body thereafter being longitudinally translated. While longitudinally translating the preform body and applying additional particulate material to the end thereof, the starting member is continuously removed from the preform body leaving a longitudinal aperture remaining in the preform body. The so formed preform may thereafter be heated, consolidated, and drawn into an optical waveguide fiber.

An important and probably limiting factor in determining the deposition rate in the aforementioned CVD processes is related to the temperature of the gas stream in which the soot particles are entrained. See the publication, P. G. Simkins et al., "Thermophoresis: The Mass Transfer Mechanism in Modified Chemical Vapor Deposition", Journal of Applied Physics, Vol. 50, No. 9, September, 1979, pp. 5676–5681. Thermophoresis drives the soot particles from the hotter parts of the gas stream toward the cooler parts. Because the preform surface is usually cooler than the surrounding gas stream, the action of thermophoresis tends to drive the soot particles toward the preform surface. When a surface is nearly as hot as the surrounding gas steam, the temperature gradient is low. Thus, the thermophoresis effect is minimal, and the deposition rate is low. However, when the surface temperature of the preform is low, the thermophoresis effect due to the large thermal gradient results in a relatively high deposition rate.

In the aforementiond prior art, a burner is continuously directed at one position on the preform. Thus, the preform surface becomes hot, and the rate of deposition is limited by the small temperature gradient between the preform surface and the soot containing gas stream.

SUMMARY OF THE INVENTION

It is therefore an object of the present invention to improve the deposition efficiency of a vapor phase oxidation process for making optical waveguide preforms.

Briefly, the method of the present invention is as follows. Means such as a burner directs a stream of glass particulate material toward a lateral surface of a cylindrical core member to build up a first coating thereon. The core member is provided with rotational movement and is provided with longitudinal movement in one direction with respect to the burner. Additionally, there is provided an oscillating movement of the burner with respect to a portion of the length of the core member. The result of the combined longitudinal and oscillating motion of the burner relative to the core material is a buildup of a given thickness of particulate material at one portion of the core material, and a gradual tapering of the particulate material from its given thickness to zero thickness in the region in which the oscillating motion of the burner relative to the core material takes place. The oscillating motion of the burner relative to the core material permits the soot preform to cool down between successive burner passes, thus increasing deposition rate due to enhanced thermophoresis. The continual longitudinal movement between the burner and the core material permits the formation of relatively long preforms or the continuous production of preforms from which fibers may be continuously drawn, if so desired.

DETAILED DESCRIPTION OF THE INVENTION

Figure 1:
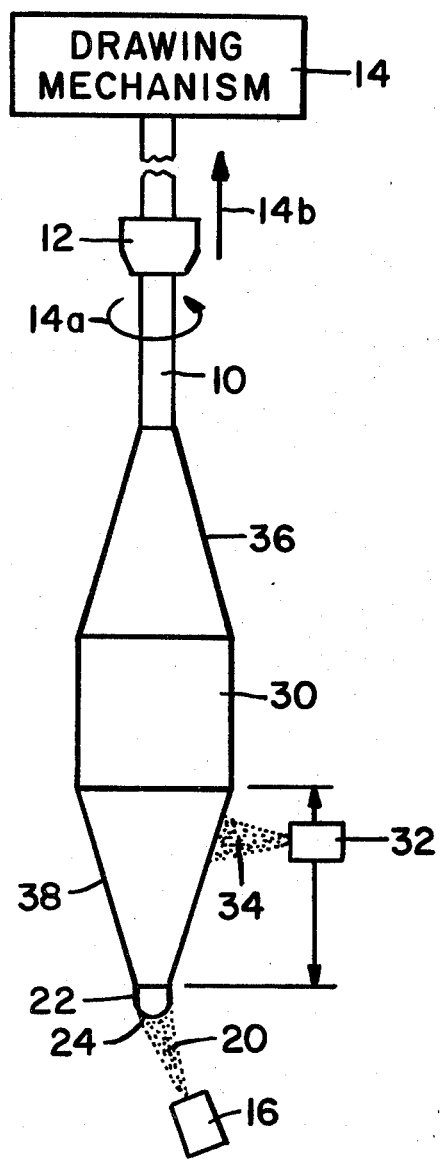
FIG. 1 is a schematic illustration of an apparatus for carrying out the method of the present invention.

In FIG. 1 mandrel 10 of silica or other high temperature refractory material is secured in chuck 12 which is rotated and translated along its longitudinal axis by mechanism 14 as illustrated by arrows 14a and 14b, respectively. Mandrel 10 is initially positioned near axial soot deposition means such as flame hydrolysis burner 16 so that the end surface thereof is in the path of the fine soot particles emitted therefrom. An adherent coating of particulate material, which will ultimately form the core portion 22 of the resultant preform, is initially deposited on the mandrel end surface. The particulate material 20 may be any material suitable for the core of an optical waveguide but must have an index of refraction higher than that of the waveguide cladding. Suitable means for delivering constituents to means 16 may be any means known in the art, for an illustration of which reference is made to U.S. Pat. Nos. 3,826,560; 4,148,621 and 4,173,305.

As the particulate material is deposited on the mandrel end surface, and the deposition is continued, a porous preform core portion is built up. By a porous preform is meant a relatively porous body wherein small particles of glass or of the material being deposited become attached to one another with some voids therebetween. End surface 24 will be continually newly formed by the deposition of the particulate material. Since deposition means 16 would as a practical matter be stationary insofar as longitudinal translation is concerned, starting member 10 is preferably translated along the longitudinal axis thereof in a direction illustrated by arrow 14b at a velocity corresponding to the rate build up of particulate material on end surface 24, so that end surface 24 is at a relatively fixed distance from means 16. Means such as that shown in FIG. 8 of U.S. Pat. No. 4,062,665 may be employed to maintain said fixed distance.

Soot deposition means 16 can comprise any soot deposition burner or burners including flat faced burners, ribbon burners, ring burners, or the like, which provide a stream of particulate material that can be directed to the core member. For an illustration of suitable burners, reference is made to U.S. Pat. Nos. 3,565,345 and 4,165,223. Means 16 may also comprise nozzles such as those disclosed in U.S. Pat. No. 3,957,474 which emit reactant vapors which are heated by means such as a laser beam to form a soot stream. Since a soot deposition burner is preferred, reference will hereinafter be made to that particular type of soot deposition means.

The present invention also contemplates rotating the burners about end surface 24. This may be in addition to rotating starting member 12, in place thereof, or any combination therewith. Other suitable means for forming a porous preform core portion by axial vapor phase oxidation techniques are disclosed in the aforementioned U.S. Pat. Nos. 3,957,474; 3,966,446; 4,062,665; 4,017,228 and 4,224,046, for example.

An adherent coating of particulate material, which will ultimately form the cladding portion 30 of the resultant preform, is deposited by soot deposition means 32 which may also comprise burners, nozzles or the like. Burner 32 may comprise a plurality of burners disposed around core portion 22, and those burners could rotate about the preform axis. In a preferred embodiment, burners 16 and 32 do not rotate around the preform axis; rather, the preform rotates in the direction of arrow 14a as it is being formed. The particulate material 34 may be any material suitable for the cladding of an optical waveguide fiber, its salient features being its optical purity and its lower refractive index relative to that of the core material.

In accordance with the present invention burner 32 traverses back and forth along the longitudinal axis of the preform. This oscillating motion of burner 32 is superimposed upon the constant relative motion of that burner with respect to the preform that is caused by movement of mandrel 10 in the direction of arrow 14b by drawing mechanism 14. The result is the formation of a conical region 36 at the start of cladding deposition and a conical region 38 at that portion of cladding 30 where burner 32 is depositing the cladding soot. Absent the oscillating motion of burner 32, the longitudinal length of the tapered region between core portion 22 and the outer surface of cladding portion 30 is determined by the width of the soot stream produced by the burner.

The longitudinal oscillation of burner 32 along core portion 22 results in increased soot deposition rates. As stated hereinabove, a thermophoresis force drives the soot particles from the hot gases emitted by the burner toward the cooler preform surface. If burner 32 were to remain stationary as taught in the prior art, the soot stream would continuously be directed at a relatively hot region of the preform upon which soot had just been deposited. In that situation the burner-emitted soot would not be strongly attracted to the region of the preform to which it is directed. Thus, more of the emitted soot would depart from its intended path and would fail to deposit on the preform. However, since burner 32 oscillates back and forth along the preform axis, the burner-emitted soot particles are directed toward a relatively cooler portion of the preform. Thus, the thermophoresis force acting upon the soot particles is greater, and deposition efficiency is increased.

Figure 2:
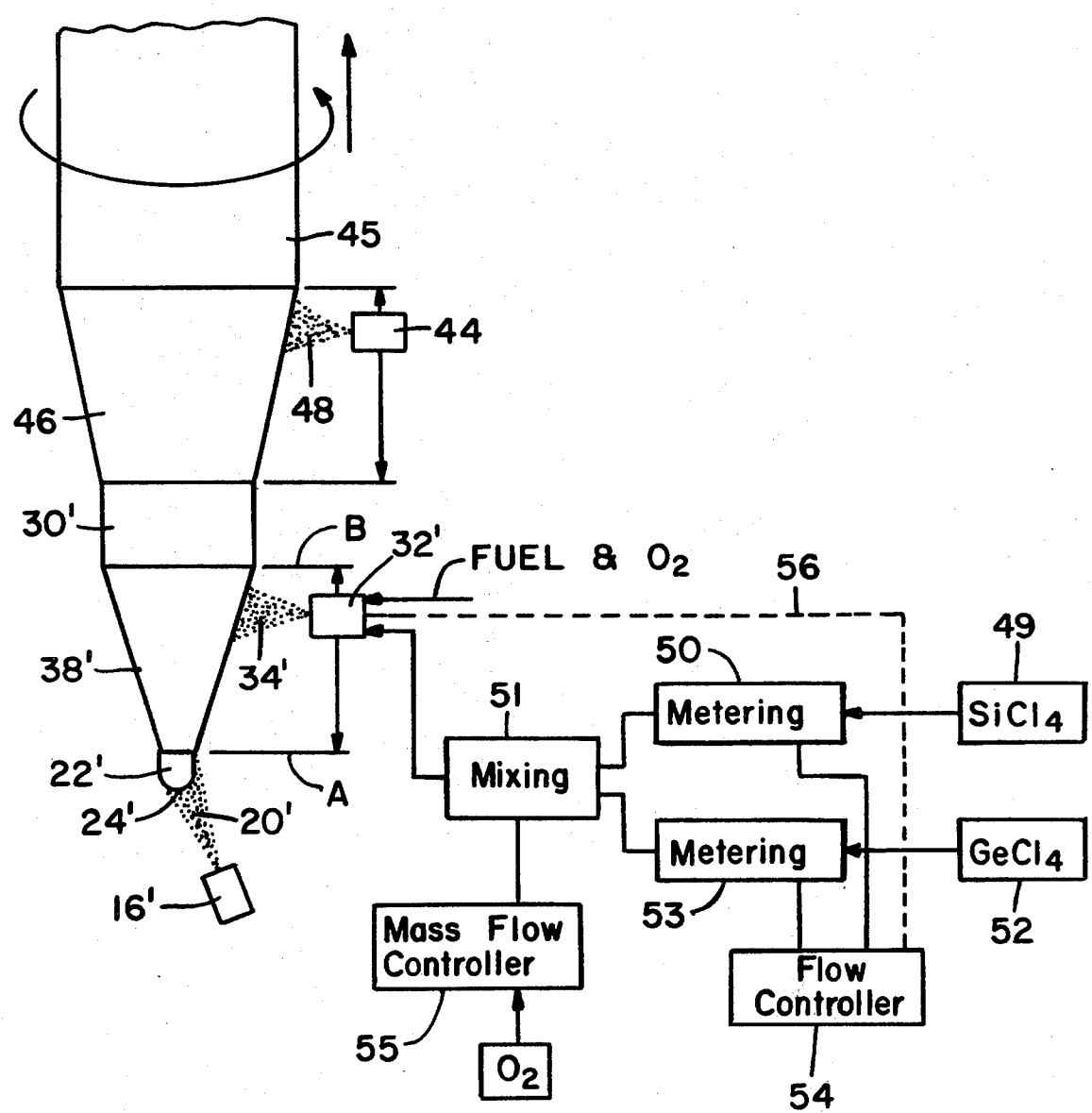
FIG. 2 illustrates another embodiment of an apparatus in accordance with the present invention.

As shown in FIG. 2, the apparatus may be provided with an additional burner 44 to form another layer 45 of particulate matter. In this figure, elements similar to those of FIG. 1 are represented by primed reference numerals. The oscillating motion of burner 44 longitudinally along the preform axis forms a conically tapered region 46. Burner 44 may deposit soot 48 having a composition which is the same as or different from that of soot 34'.

The reactant delivery system illustrated in FIG. 2 is that which is disclosed and claimed in U.S. Pat. No. 4,173,305. A source 49 of $SiCl_4$ is connected by metering pump 50 to mixing means 51. A source 52 of $GeCl_4$ is connected by metering pump 53 to mixing means 51. For additional details of the mixing means, reference should be made to U.S. Pat. No. 4,173,305, which is incorporated herein by reference. The amount of reactants flowing through pumps 50 and 53 is controlled by flow controller 54. Oxygen is supplied to mixing means 51 by way of mass flow controller 55.

To form a single-mode optical waveguide preform having a relatively small diameter core portion, burner 16' could form a core of $SiO_2$ doped with $GeO_2$ while burners 32' and 44 both deposit layers of cladding soot comprising pure $SiO_2$, for example.

To form a preform for a step index fiber, wherein the core portion has a relatively large diameter as compared with the aforementioned single-mode fiber preform, burners 16' and 32' can deposit core glass soot having the same composition and burner 44 can produce a coating of cladding soot.

Figure 3:
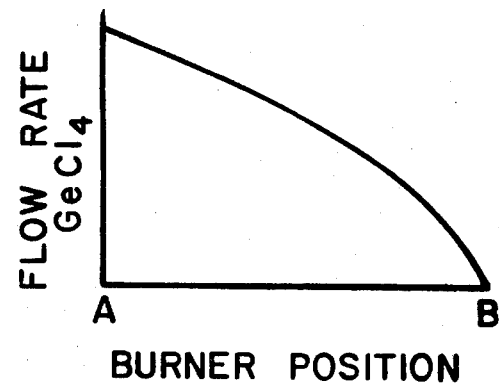
FIG. 3 is a graph of dopant flow rate as a function of burner position.

To form a gradient index fiber preform, the composition of the reactant vapor fed to burner 32' can be varied depending upon the position of that burner. Dashed line 56 connecting burner 32' to flow controller 54 is illustrative of the fact that controller 54 is provided with a signal indicative of the position of burner 32'. In this embodiment, burner 16' produces soot 20' which forms the central portion of the preform core. Soot 20' could comprise, for example, $SiO_2$ doped with one or more dopant oxides such as $GeO_2$. Burner 32' forms the remaining portion of the preform core. It therefore produces a stream of soot containing a maximum amount of dopant oxide when it reaches position A of its oscillatory movement, the soot containing less dopant material when burner 32' reaches position B. This could be accomplished, for example, by maintaining a constant flow of $SiCl_4$ through metering pump 50 while varying the flow of $GeCl_4$ through metering pump 53 in accordance with the position of the burner in the manner illustrated by the graph in FIG. 3. The maximum dopant concentration of soot 34' should be slightly less than that of soot 20'.

Figure 4:
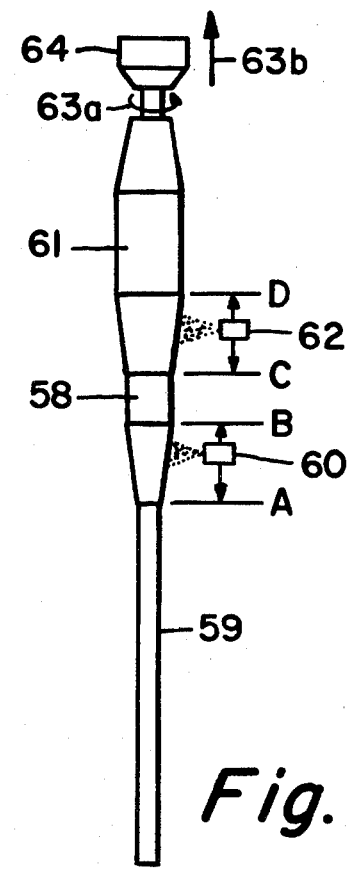
FIG. 4 illustrates a further embodiment of an apparatus in accordance with the present invention.

In the embodiment of FIG. 4 a coating 58 of soot is deposited on mandrel 59 by burner 60, and a coating 61 is deposited on the surface of coating 58 by burner 62. As is well known in the art, mandrel 59 may be formed of a material such as glass, ceramic or the like having a coefficient of expansion compatible with that of the deposited material. Mandrel 59 is rotated and longitudinally translated as indicated by arrows 63a and 63b by chuck 64. Burner 60 oscillates between positions A and B, and burner 62 oscillates between positions C and D. If mandrel 59 is to be removed from the porous preform prior to consolidation thereof, the mandrel surface may be coated with a layer of carbon soot prior to the deposition of glass soot thereon as taught in U.S. Pat. No. 4,233,052.

Mandrel 59 may consist of a rod of high purity glass having a refractive index suitable for use as the core portion of an optical waveguide fiber. For example, the rod could have a graded or a constant refractive index. In such an embodiment, one or more layers of cladding glass soot of lower refractive index than the core glass may be deposited on the core glass rod and thereafter consolidated thereon to form a solid glass draw blank suitable for the drawing of optical waveguide fibers.

Figure 5:
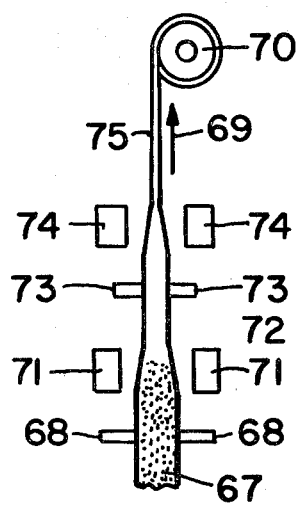
FIG. 5 illustrates a continuous fiber drawing process.

After the preforms produced in accordance with the aforementioned methods have reached a suitable length, they may be removed from the deposition apparatus and transported to a consolidation furnace where they are heated to a temperature sufficiently high to consolidate the glass soot particles and form a solid glass optical waveguide draw blank. However, if the process is to continuously produce optical waveguide fiber, an apparatus such as that illustrated in FIG. 5 may be employed. This apparatus is similar to that taught in U.S. Pat. No. 4,230,472 and in U.S. patent application Ser. No. 155,422 entitled "Method and Apparatus for Forming an Optical Waveguide Preform Having a Continuously Removable Starting Member", filed June 2, 1980, now U.S. Pat. No. 4,310,339. Soot preform 67 is supported and rotated by means 68 while it is longitudinally translated thereby in the direction of arrow 69 by reel 70. Means 68 may comprise, for example, a plurality of rollers surrounding preform 67 and mounted so as to support, rotate and translate the structure. Such support roller means are well known in the art. Heaters 71 heat the porous preform to a temperature sufficient to consolidate it into a solid glass rod 72. The consolidated rod is supported and rotated by means 73 which is similar to the aforementioned means 68. The consolidated rod 72 passes between heaters 74 where the temperature thereof is raised to the drawing temperature of the materials thereof and is drawn into an optical waveguide fiber 75 which is wound on reel 70. Thus, a preform being formed in accordance with the present invention may be simultaneously drawn into a fiber.

The following experiments were performed to illustrate the improvement in deposition rate achieved by the method and apparatus of the invention. Cylindrical mandrels were supported in a horizontal position in a lathe. A single burner of the type disclosed in U.S. Pat. No. 4,165,223 was employed. The inner shield and outer shield oxygen flow rates were 3.5 slm and 10.0 slm, respectively. The only reactant employed, SiCl₄, was maintained at 37° C. in a reservoir of the type disclosed in U.S. Pat. No. 3,826,560. Oxygen flowing at a rate of 1.75 slm was bubbled through the liquid SiCl₄, and the mixture of oxygen and SiCl₄ vapor, which was also flowing at the rate of about 1.75 slm was fed to the burner. The burner face was maintained at a distance of about 120 mm from the center of the mandrel. In one set of experiments, silica soot was deposited by a stationary burner onto mandrels. In another set of experiments, all other conditions remaining the same, silica soot was deposited on mandrels by translating the burner back and forth along a 25 centimeter section of each mandrel at a rate of 1.75 cm/sec. In both sets of experiments, soot was deposited for ten minutes. Two different types of mandrels were employed, 51 millimeter diameter borosilicate tubes and 19 millimeter diameter quartz tubes. Various rotation rates were used for both sizes of mandrels. The mandrels were weighed before and after the soot deposition process on a Mettler open pan balance.

When employing 51 millimeter tubes, fuel gas (CH₄) and oxygen were flowed to the burner at rates of 11.0 slm and 11.2 slm, respectively. The tubes were subjected to a 3-minute preheat by the burner prior to the deposition of silica soot thereon to bring the tube surface to steady state temperature. The results of these experiments are tabulated below in Table 1.

TABLE 1

| Mandrel RPM | Soot Deposited (gr) Burner | | % Improvement In Deposition Rate |
|---|---|---|---|
| | Moving | Fixed | |
| 240 | 17.1 | 16.8 | 2.0 |
| 100 | 18.6 | 15.8 | 15.0 |
| 50 | 22.4 | 17.5 | 22.0 |
| 11 | 20.9 | 17.1 | 18.0 |

When employing 19 millimeter bait tubes, only a 1-minute preheat was employed because of the small mass of the tube. Also, the flow rates of fuel gas and oxygen to the burner were decreased in accordance with the values set forth in Table 2 to decrease the flame temperature. For any given mandrel rotational speed, the flow rates of fuel gas and oxygen were the same for both the moving and fixed burner experiments.

TABLE 2

| Fuel-Oxygen Flow Rates (slm) - 19 mm Tubes | | |
|---|---|---|
| Mandrel RPM | CH₄ | O₂ |
| 230 | 9.1 | 8.5 |
| 130 | 9.1 | 8.5 |
| 11 | 7.6 | 7.0 |

The results of the experiments involving the 19 millimeter diameter tubes are reported in Table 3.

TABLE 3

| Mandrel RPM | Soot Deposited (gr) Burner | | % Improvement In Deposition Rate |
|---|---|---|---|
| | Moving | Fixed | |
| 230 | 5.75 | 5.14 | 11.0 |
| 130 | 5.64 | 5.11 | 9.0 |
| 11 | 6.55 | 3.93 | 40.0 |

The percentage improvement obtained by employing a moving burner as compared with a fixed burner is tabulated in Tables 1 and 3. The greatest improvement is obtained when the mandrel rotation speed is relatively low. It is therefore preferred that the mandrel rotation rate be in the range between 10 and 50 RPM when depositing layers by the moving burner or burners employed in the method and apparatus of the present invention.

Figure 6:
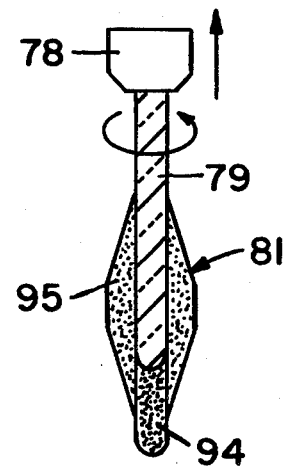
FIG. 6 is a cross-sectional view of a mandrel and preform illustrating the initial stage of preform formation.
Figure 7:
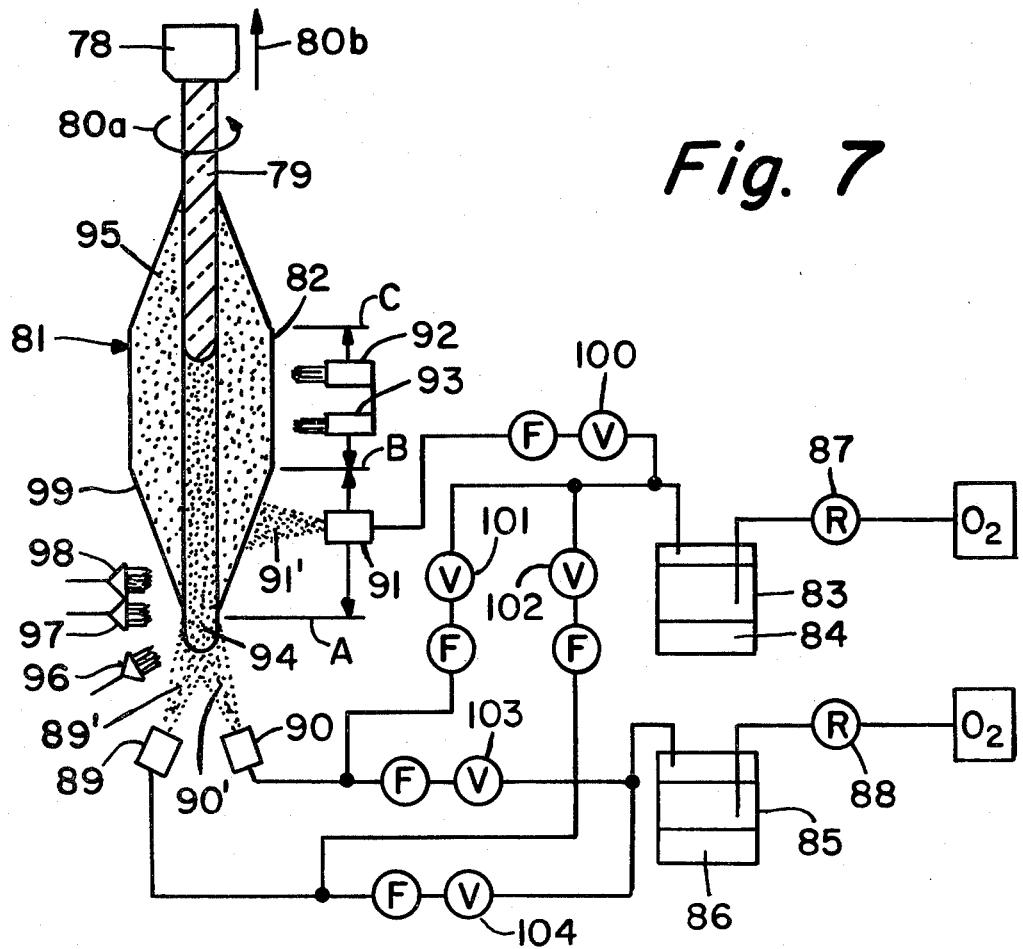
FIG. 7 illustrates an apparatus in accordance with the present invention which was employed in the formation of an optical waveguide preform.

A specific example of a method of producing a step index fiber in accordance with the present invention is as follows. Referring to FIGS. 6 and 7 there is shown a chuck 78 for supporting mandrel 79 in a vertical position. Chuck 78 is connected to a drawing mechanism which simultaneously rotates mandrel 79 and translates it vertically upwardly as indicated by arrows 80a and 80b. FIG. 6 illustrates in cross-section the formation of the initial portion of preform 81, while FIG. 7 illustrates in cross-section the formation of a sufficient amount of preform 81 so that the outer cladding surface 82 has achieved its final diameter.

The reactant delivery system and soot deposition system are illustrated in FIG. 7. A pressurized reservoir 83 containing SiCl₄ is maintained at a temperature of 40° C. by heater 84. A pressurized reservoir 85 containing GeCl₄ is maintained at a temperature of 45° C. by heater 86. Regulator valves 87 and 88 regulate the flow of oxygen to reservoirs 83 and 85 so that the pressure within these reservoirs is 1,000 Torr.

Burners 89, 90, 91, 92 and 93 are flame hydrolysis-type burners of the kind illustrated in the aforementioned U.S. Pat. No. 4,165,223. Burners 89 and 90 are both located about 125 mm below the core portion 94 of the soot preform. Burner 91 is located about 145 mm from the lateral surface of core portion 94 when it is located at point A. Burners 92 and 93 are located about 125 mm from outer cladding surface 82. Auxiliary burner 96 is located at the end of core portion 94, and auxiliary burners 97 and 98 are located in the region where conical surface 99 of the cladding meets core portion 94. Burners 89 and 90 emit soot 89′ and 90′ which forms core portion 94, and burner 91 emits soot 91′ which forms the cladding portion 95 of preform 81. Burners 92 and 93, although flame hydrolysis-type burners, were merely used as auxiliary heating burners to harden the cladding soot. Auxiliary heating burners 96, 97 and 98 are also employed for the purpose of hardening the soot. That portion of soot particles 89′ and 90′ which deposits on the region of conical surface 99 of smallest diameter, normally tends to be "soft" in that the particles are very loosely bound together. If allowed to remain in that state, the resultant preform would have an annular region of soft soot which would tend to crack during the consolidation process. Burners 96, 97 and 98 are employed primarily for the purpose of heating the soft soot particles to cause them to strongly adhere to one another, thereby eliminating the aforementioned problem.

Oxygen flowing into reservoirs 83 and 85 is bubbled through the liquid reactants disposed therein, thereby entraining known proportions of the liquid reactants. Valves 100, 101 and 102 control the amount of oxygen-SiCl₄ vapor mixture which flows to burners 91, 90 and 89, respectively. Valves 103 and 104 control the amount of oxygen-GeCl₄ vapor mixture delivered to burners 90 and 89, respectively. The flow rates in liters per minute to the various burners are set forth in Table 4.

TABLE 4

| Burner Number | Gas | O₂ | Inner Shield O₂ | Flow of Oxygen & Vapor from Bubbler | |
|---|---|---|---|---|---|
| | | | | SiCl₄ | GeCl₄ |
| 89 | 0.7 | 0.2 | 0.45 | 0.38 | 0.18 |
| 90 | 0.62 | 0.18 | 0.54 | 0.58 | 0.13 |
| 98 | 1.02 | 0.7 | — | — | — |
| 97 | 0.94 | 0.65 | — | — | — |
| 96 | 0.46 | 0.29 | — | — | — |
| 91 | 1.95 | 1.21 | 2.88 | 0.97 | — |
| 93 | 3.0 | 1.84 | 2.88 | — | — |
| 92 | 1.7 | 1.4 | 2.88 | — | — |

Mandrel 79 was a 1.2 M long quartz tube having an outside diameter of 19 mm. The end of the tube on which the core soot was to be deposited was flame worked into a round, closed shape. The rounded end of tube 79 should have approximately the same shape as the rounded end of the core portion 94 during steady state conditions. The length of finished preform 81, after a total deposition time of 5 hours, was 500 mm. During the soot deposition process the average velocity of oscillating burner 91 between positions A and B was 250 mm/min. The total traverse distance of burner 91 was 190 mm. Auxiliary heating burners 92 and 93 were mounted on a common platform which oscillated them between positions B and C at an average velocity of 200 mm/min.

Preform 81 was consolidated in a furnace at a temperature of about 1550° C. through which helium was flowing at the rate of 10 lpm. The feed rate of the preform into the furnace was about 380 mm per hour. The consolidated draw blank was mounted in a conventional fiber drawing furnace where the end thereof was heated to the drawing temperature of the materials thereof. The diameter of the resultant fiber was about 125 μm, the core diameter being about 50 μm. Three reels of fiber were drawn, each containing about 1,000 meters. One reel of fiber exhibited an attenuation of 2.90 dB/km at 850 nanometers and 1.54 dB/km at 1060 nanometers. A second reel exhibited an attenuation of 3.30 dB/km at 850 nanometers and 1.92 dB/km at 1060 nanometers. A third reel exhibited an attenuation of 5.57 dB/km at 850 nanometers and 3.98 dB/km at 1060 nanometers.

I claim:

1. In a method of forming a porous glass preform comprising the steps of
    providing an elongated cylindrical core member, directing a first stream of glass particulate material toward a lateral surface of said core member to build up a first coating of given thickness thereon,
    rotating said core member with respect to said stream of particulate material, and longitudinally moving said core member in one direction with respect to said stream of particulate material,
    the step of directing being characterized in that it comprises continuously reciprocating said stream of particulate material with respect to a portion of the length of said core member to deposit and build up in the region of reciprocating movement of said stream a coating of thickness which tapers from said given thickness to zero thickness.

2. A method in accordance with claim 1 wherein the step of providing an elongated cylindrical core member comprises providing a starting member having at least one end surface, applying an adherent coating of glass particulate material to said end surface and longitudinally translating said starting member while continuously applying said adherent coating of particulate material to form said core member.

3. A method in accordance with claim 2 wherein the refractive index of said core member is greater than the refractive index of said first coating.

4. A method in accordance with claim 2 further comprising the step of directing a second stream of glass particulate material toward a lateral surface of said first coating to build up a second adherent coating of glass particulate material thereon, the refractive index of said second coating being lower than that of said core member and said first coating.

5. A method in accordance with claim 4 wherein the step of directing a first stream of glass particulate material comprises depositing glass particulate material containing at least one dopant oxide for changing the refractive index thereof, the concentration of said one dopant oxide being at a maximum when said first stream of glass particulate material is at one extreme position of its reciprocating movement and is at a minimum when said first stream of glass particulate material is at the opposite extreme of its reciprocating movement.

6. A method in accordance with claims 3, 4 or 5 further comprising the steps of continuously feeding the resultant preform into a high temperature furnace to consolidate it, thereby forming a solid blank, further heating the structure so formed to the drawing temperature of the materials thereof, and drawing the heated structure so formed to reduce the cross-sectional area thereof and form a substantially continuous optical waveguide fiber.

7. A method in accordance with claim 1 wherein the step of providing an elongated cylindrical core member comprises providing an elongated rod of high purity glass having a refractive index greater than that of said first coating.

8. A method in accordance with claim 1 wherein the step of providing an elongated cylindrical core member comprises providing a temporary mandrel, said method further comprising the step of depositing a second adherent coating of glass particulate material on the surface of said first coating, the refractive index of said second coating being less than that of said first coating, and thereafter removing said temporary mandrel to form a porous preform.

9. A method in accordance with claim 8 wherein the step of directing a first stream of glass particulate material comprises depositing glass particulate material containing at least one dopant oxide for changing the refractive index thereof, the concentration of said one dopant oxide being at a maximum when said first stream is at one extreme position of its reciprocating movement, the concentration of said dopant oxide being at a minimum when said first stream is at the opposie extreme position of its reciprocating movement.

10. A method in accordance with claims 8 or 9 further comprising the steps of heating said porous preform to sinter or consolidate it thereby forming a solid blank, further heating the structure so formed to the drawing temperature of the materials thereof, and drawing the heated structure so formed to reduce the cross-sectional area thereof and form a substantially continuous optical waveguide fiber.

11. A method in accordance with claim 1 wherein the step of directing a first stream of glass particulate material comprises depositing glass particulate material containing at least one dopant oxide for changing the refractive index thereof, the concentration of said one dopant oxide being a function of the position of said stream along the path of its reciprocating movement.

12. A method of forming a cylindrically-shaped porous glass preform comprising the steps of
providing an elongated cylindrical core member,
directing a first stream of glass particulate material toward a lateral surface of said core member to build up a first coating thereon,
rotating said core member,
longitudinally moving said core member, and
reciprocatingly moving said stream of particulate material with respect to a portion of the length of said core member to deposit a particulate material coating, each cycle of reciprocating movement spanning a different portion of the length of said core member than the preceding cycle, whereby continuous reciprocation of said stream causes a tapered coating to be built up.

13. In a method of forming a porous glass preform comprising the steps of
providing a substrate, and
directing a stream of glass particulate material toward said substrate to form a porous coating thereon, the improvement comprising
reciprocatingly moving said stream of glass particulate material with respect to a portion of said substrate, the concentration of a dopant constituent within said stream of glass particulate material varying as a function of the position of said stream along the path of its reciprocating movement, the portion of said porous coating along which said stream is being reciprocatingly moved is conically-shaped, the change in concentration of said dopant constituent being such that the refractive index of said particulate material is greatest when said stream is directed toward the region of said conically-shaped coating having the smallest radius.

14. An apparatus for forming a porous cylindrically-shaped glass preform, comprising
means for supporting an elongated cylindrical core member,
means for rotating said core member,
means for longitudinally moving said core member in a first direction,
means for depositing on said core member a coating of particulate material which has a given thickness throughout a portion of its length and a thickness which tapers from said given thickness to zero thickness at one end thereof, said means for depositing comprising means for directing a first stream of glass particulate material toward a lateral surface of said core member and means for reciprocatingly moving said particulate material directing means with respect to that portion of the length of said core member along which the tapered portion of said coating extends.

15. An apparatus in accordance with claim 14 wherein said cylindrical core member comprises a continuously formed porous glass article.

16. An apparatus in accordance with claim 15 further comprising means for directing a second stream of glass particulate material toward a lateral surface of said first coating to build up a second adherent coating of glass particulate material thereon.

17. An apparatus in accordance with claim 14 wherein said means for depositing comprises means for generating a stream of particulate material the composition of which includes at least one dopant, said apparatus further comprising means for varying the composition of said dopant as a function of the position of said means for depositing along its path of reciprocation.

* * * * *